United States Patent [19]

Maraldo

[11] Patent Number: 5,111,000
[45] Date of Patent: May 5, 1992

[54] ENCLOSURE FOR SEMI-BURIED ELECTRICAL DISTRIBUTION APPARATUS

[76] Inventor: Claude A. Maraldo, 6254 Louis XIV St., New Orleans, La. 70043

[21] Appl. No.: 585,934

[22] Filed: Sep. 21, 1990

[51] Int. Cl.$^5$ .......................... H02G 9/00; H02B 5/00
[52] U.S. Cl. ...................... 174/38; 361/332; 361/333; 361/356
[58] Field of Search ............... 174/37, 38, 50; 336/65, 336/90; 361/331, 332, 333, 356; 52/20, 21

[56] References Cited

U.S. PATENT DOCUMENTS

| 2,717,275 | 9/1955 | Hayden et al. | 174/37 |
| 4,005,253 | 1/1977 | Walter | 174/37 |

FOREIGN PATENT DOCUMENTS

| 1023836 | 1/1978 | Canada | 174/38 |
| 2401531 | 7/1975 | Fed. Rep. of Germany | 174/37 |
| 2450571 | 4/1976 | Fed. Rep. of Germany | 336/90 |
| 432618 | 9/1967 | Switzerland | 174/37 |

OTHER PUBLICATIONS

Walter, G. W., "A Universal Enclosure for Underground Electrical Systems as an Alternate to Pad Mounted Gear", paper presented at the 1976 Underground Transmission and Distribution Conference, Atlantic City, N.J., Sep. 27 to Oct. 10, 1976, pp. 644-648.

Primary Examiner—Leo P. Picard
Assistant Examiner—Bot Ledynh
Attorney, Agent, or Firm—Thomas S. Keaty

[57] ABSTRACT

An enclosure for an electrical distribution unit which includes a transformer provides for a semi-buried positioning of the transformer to allow easy access to electrical conductors of a power source. The enclosure includes a housing unit and an underground vault within which at least part of the housing unit is positioned. The housing unit extends partly above the ground, so as to allow easy access to connections for the distribution unit from the ground level. An inclined front wall of the housing unit facilitates such connections. A hingedly attached cover closes a part of the inclined front wall of the housing unit above the ground and prevents adverse effects of the environment on the electrical distribution unit positioned within the housing unit.

12 Claims, 1 Drawing Sheet

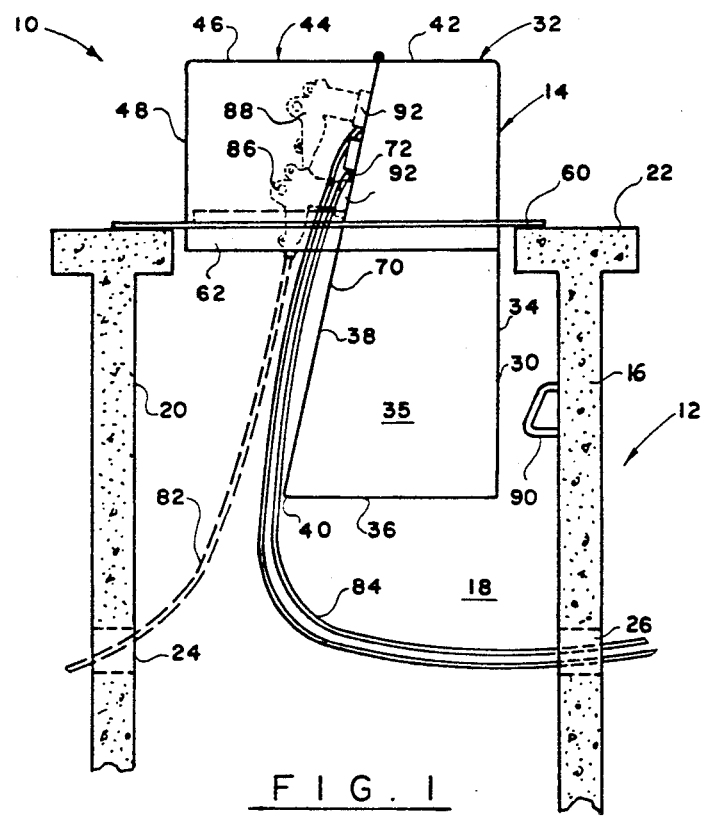
FIG. 1
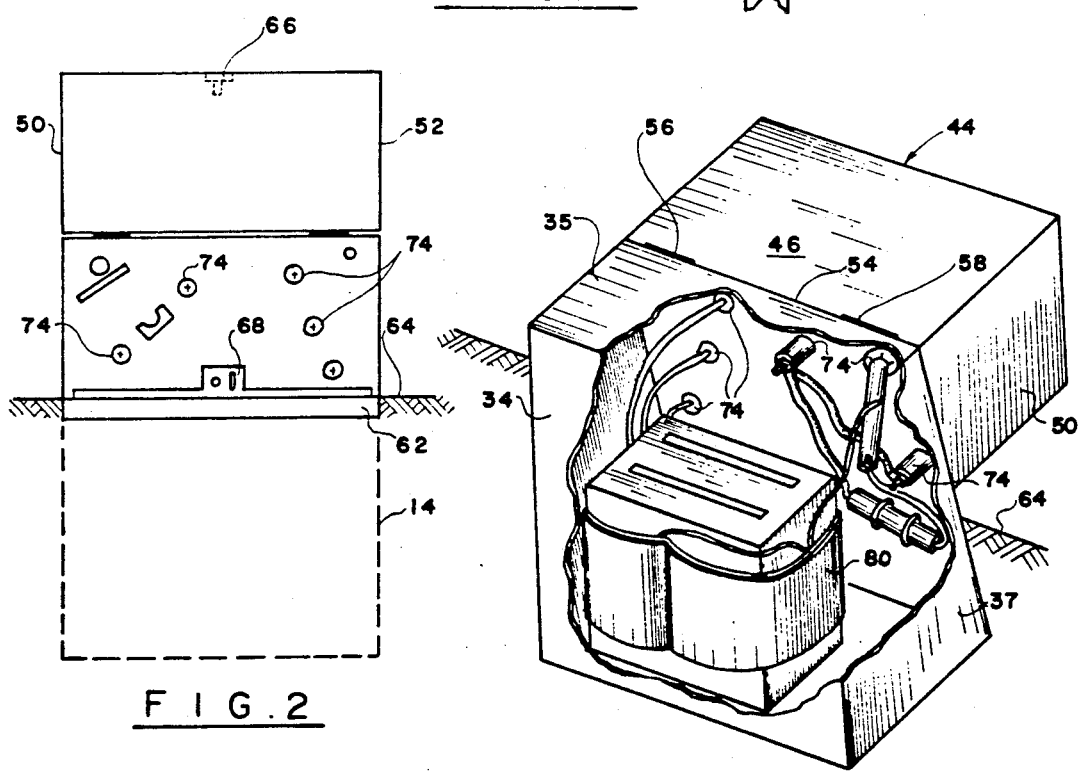
FIG. 2
FIG. 3

ENCLOSURE FOR SEMI-BURIED ELECTRICAL DISTRIBUTION APPARATUS

BACKGROUND OF THE INVENTION

The present invention relates to an electrical apparatus, and more particularly to an enclosure for electrical distribution apparatus suitable for use in residential and commercial areas.

It has been a continuous problem in the field of landscaping to eliminate above ground transformer housing units or to some degree camouflage them. In order to satisfy aesthetic requirements of the landscape architects, the electrical companies designed underground vaults, wherein transformer and all associated electrical distribution equipment is positioned.

However, new problems demonstrated themselves with the use of such type of housings. The manholes or vaults which lie in low water areas often get flooded and, if one or more elements or connections within the transformer unit malfunction, the repair crew is forced to pump out water from the vault before gaining access to the malfunctioning equipment. Such approach proves to be labor and time consuming. In addition, the corrosion which sets in a damp environment in an underground vault often shortens the life of the distribution unit, which also leads to additional expenses of repairing and replacing the corroded parts.

The present invention contemplates provision of a semi-buried housing for electrical distribution apparatus which eliminates the problems associated with the prior art.

SUMMARY OF THE INVENTION

It is an object of the present invention to provide an enclosure for electrical distribution apparatus which minimizes the above the ground portion of the enclosure and protects the electrical connections, bushings and plugs from direct contact with underground water.

It is a further object of the present invention to provide a semi-buried enclosure for an electrical distribution unit which places the largest portion of the electrical distribution unit underground.

It is still a further object of the present invention to provide an enclosure which allows easy access to the electrical connection cables at above the ground level.

These and other objects of the present invention are achieved by provision of a two-part enclosure apparatus for an electrical distribution unit. The enclosure comprises a subway vault which has a continuous reinforced concrete side wall, an open top and an open bottom. Suspended on the upper end of the subway vault and extending in part under the ground level is a housing means which comprises an underground portion and an above the ground portion. The housing means is formed as a closed unit with a closed bottom, closed top, vertically oriented back wall and an outwardly inclined front wall, with an angle of inclination being away from a central vertical axis of the enclosure. Hingedly attached to an upper edge of the front wall is a cover or lid which entirely closes that portion of the front wall located above the ground. A plurality of openings are formed in the continuous side wall of the subway vault to allow access of the electrical apparatus to underground electrical power conductors. A plurality of apertures are formed in the front wall upper portion, which defines a control panel for the electrical apparatus to allow attachment and passing of various electrical connectors to the electrical apparatus positioned within the housing.

The inclined control panel allows easy access and connection of various electrical conductors to the electrical apparatus and prevents excessive bending of the electrical cables reaching behind the front wall into the interior of the housing to be connected to the electrical apparatus.

BRIEF DESCRIPTION OF THE DRAWINGS

Reference will now be made to the drawings wherein FIG. 1 is a partially cross-sectional side view of the enclosure for the electrical distribution unit in accordance with the present invention.

FIG. 2 is a detail front view of the above the ground portion of the housing in accordance with the present invention; and FIG. 3 is a partially cut away back view of the enclosure in accordance with the present invention.

DETAILED DESCRIPTION OF THE PREFERRED EMBODIMENT

Referring now to the drawings in more detail, the enclosure for a semi-buried electrical distribution unit is designated generally by numeral 10. The enclosure comprises a subway vault means 12 and a housing means 14 which rests on a top end of the subway vault 12. The subway vault means 12, as seen in FIG. 1, comprises a cylindrical concrete open end vault 16, within which an open chamber 18 is formed. The vault 16 has a cylindrically shaped vertically oriented continuous wall 20 and a transversely oriented top part 22 integrally formed with the vertical wall 20. As is illustrated in the drawing, the walls of the vault 16 form a T-shaped cross section. A number of openings such as 24 and 26 are formed through wall 20, the openings being adapted to receive cables or conductors leading to and from a distribution transformer unit, as will be described in more detail hereinafter.

The chamber 18 is formed large enough to easily accommodate the housing 14, which houses a transformer unit of standard size, as well as to leave space for cables and possible positioning of an additional or larger transformer housing which may be required when expansion of electrical services demand so.

The walls of the vault 16 can be formed from reinforced concrete or other suitable material which prevents easy destruction and moisture penetration to the electrical apparatus positioned within the chamber 18. In an exemplary embodiment, the depth of the chamber 18 can be three or four feet, but can vary depending on the size of the transformer. In any case, the chamber 18 should be large enough to accommodate transformer housings for transformers from 25 kva to 167 kva and more.

Extending partially into the chamber 18 is a lower portion 30 of the metal housing 14 which actually houses the transformer coils therein. The portion 30 is formed by a vertically oriented back wall 34 extending from below the ground level upwardly and continues as an integral wall, and forms a part of the above the ground upper portion 32. The housing portion 30 has a closed bottom 36 which is transversely attached in end-to-end arrangement to the wall 34. An inclined inner wall 38 extends from an innermost end 40 of the bottom 36 and terminates at the above the ground level where it is intercepted by a transverse horizontal upper wall 42. The walls 36 and 42 are generally parallel to each other, as can be seen in FIG. 1. The housing 14 is enclosed by vertical side walls 35 and 37.

Hingedly connected to the transformer receiving housing 14 is a cover, or lid, 44 which has a top wall 46, a front wall 48 and a pair of parallel side walls 50 and 52.

The top wall 46 has a rear edge 54 which is hingedly connected by hinges 56 and 58 to the top edge of the inclined wall 38 of the transformer receiving housing portion 32. A peripheral flange 60 is attached to a reinforcing plate 62 at the ground level and extends about the periphery of the housing 14 to a distance outwardly therefrom except front wall 38. The flange 60 extends past the limit of side walls 35 and 37 and towards the front wall 48 of the cover 44, encircles the walls 50 and 52 to form a transverse "skirt" about the housing 14 and the cover 44. The flange 60 allows the housing 14 to rest on the top end of the transverse wall 22 of the vault 16.

The peripheral vertical reinforcing plate 62 likewise substantially follows the walls 34, 35, 52, 48, 50 and 37 of the housing 14 and cover 44 and extends a distance below the ground level 64. The flange 60 is attached to the top edge of the plate 62. The wall connections of the housing 14 and the lid or cover 44 are accomplished by bolts, welding or other similar suitable means.

Fixedly attached to the front wall 48 of the cover 44 is a locking latch 66 which is hingedly attached to the front wall 48 and is adapted to engage with a locking loop 68 carried by the top surface of the flange 60.

The angularly inclined wall 38 of the housing portion 32 has a subway portion 70 and an above-the-ground portion 72 which defines the front wall of the housing portion 32. The wall portion 72 is provided with a plurality of openings 74, each designed and adapted to accommodate a cable, a bushing attachment or a conductor which is normally found in an electrical distribution unit of standard design.

In operation, a transformer 80 of the required size is lowered into the housing 14 to rest within the subway portion 30 of the housing 14, such that all transformer coils are positioned underground and the uppermost part of the transformer 80 extends above the ground level. Anti-corrosion substance, such as oil, is deposited in the housing portion 30 to cover that portion of that transformer which appears to be underground to provide insulation and to prevent overheating as well as corrosion and moisture damage to the electrical apparatus. Suitable cables, such as 82 and 84 are extended through aperture 24 and 26 formed in the wall 20 and are connected to bushings 86 and 88, respectively. The bushing connectors 90 and 92 are mounted about the apertures 74 and extend inwardly past the wall portion 72 to connect with the cables of the transformer 80.

In a similar manner, secondary cable lines and bushings are connected to the transformer 80 to allow normal operation of electrical distribution within a subdivision. The space of chamber 18 is large enough to accommodate the required number of the cables.

The lid 44 is hingedly open to allow easy access to wall 72 which serves as a control panel for the transformer unit. Being inclined, the wall 72 allows easy connection without bending of the cables and associated connectors, making it more convenient and easy for the electrician to install and place in the operative mode the transformer 80. The connecting work having been complete, the lid 44 is lowered and locked through the use of locking latch and loop portions 66 and 68.

When servicing or repairing of the transformer connections is required, or when it is necessary to substitute a transformer by a larger one, the cover 44 is lifted again, allowing the person working on the ground level easy access to the control panel and extraction of the housing 14, if so required.

As an optional feature, a bracket 90 can be attached to interior surface of the wall 20 to allow installation of a feed-through bushing.

The metal from which the walls of the housing are formed should be non-corrosive, for example stainless steel or the like.

The unit of the present invention allows to take advantage of a subway positioning of a major part of a transformer unit, while avoiding drawbacks associated with a completely buried transformer manhole. The electrical connections which need to be checked and changed regularly extend above the ground, in an easily accessibly position, which significantly improves and facilitates the servicing of the electrical distribution apparatus positioned within the housing.

Many changes and modifications can be made within the design of the present invention without departing from the spirit thereof. I, therefore, pray that my rights to the present invention be limited only by the scope of the appended claims.

I claim:

1. An enclosure for an electrical apparatus, comprising:
   a subway vault having an open top and an open bottom;
   a vertically oriented housing means for housing the electrical apparatus and having a lower portion extending a distance into said vault and an upper portion integrally formed with the lower portion and extending upwardly therefrom, said upper portion being positioned substantially above ground;
   means for suspending said housing means on a top edge of the subway vault; and
   a cover means hingedly attached to a top front edge of said upper portion and substantially enclosing that part of an upper portion front wall extending above ground.

2. An enclosure for electrical apparatus, comprising:
   a subway vault having an open top and an open bottom;
   a vertically oriented housing means for housing the electrical apparatus and having a lower portion extending a distance into said vault and an upper portion integrally formed with the lower portion and extending upwardly therefrom, said upper portion being positioned substantially above ground, said housing means comprising a closed bottom, a closed top, a pair of parallel side walls, a vertically oriented back wall and an inclined front wall control panel means for the electrical apparatus to be positioned within the housing means to allow the positioning of an electrical connectors for the electrical apparatus entirely above ground; and
   a cover means hingedly attached to a top front edge of said upper portion and substantially enclosing that part of an upper portion front wall extending above ground.

3. The apparatus of claim 1, wherein said subway vault comprises a vertically oriented continuous side wall defining a housing means receiving space and a transverse upper wall, at least a part of which extends inwardly into the housing means receiving space in substantially perpendicular relationship to a vertical axis of the subway vault.

4. An enclosure for an electrical apparatus, comprising:
   a subway vault having an open top end and an open bottom, said subway vault comprising a vertically oriented continuous side wall defining a housing means receiving space and a transverse upper wall, at least a part of which extends inwardly into the housing means receiving in a space substantially perpendicular relationship to a vertical axis of the subway vault;
   a vertically oriented housing means for housing the electrical apparatus and having a lower portion extending a distance into said vault and an upper portion integrally formed with the lower portion and extending upwardly therefrom, said upper portion being positioned substantially above ground;
   a cover means hingedly attached to a top front edge of said upper portion and substantially enclosing that part of an upper portion front wall extending above ground; and
   a peripheral flange extending substantially about an entire periphery of the housing means and the cover means and adapted to rest on the transverse upper wall of the subway vault, thereby supporting the housing means on the subway vault upper wall.

5. The apparatus of claim 3, wherein said continuous side wall is formed with a plurality of openings extending therethrough to allow access of the electrical apparatus to underground electrical conductors.

6. An enclosure for an electrical apparatus, comprising:
   a subway vault having an open top and an open bottom;
   a vertically oriented housing means for housing the electrical apparatus and having a lower portion extending a distance into said vault and an upper portion integrally formed with the lower portion and extending upwardly therefrom, said upper portion being positioned substantially above ground, said housing means comprising a closed bottom, a closed top, a pair of parallel side walls, a vertically oriented back wall and an inclined front wall which defines an inclined control panel means for the electrical apparatus to be positioned within the housing means, wherein said control panel means is provided with a plurality of apertures to allow positioning of electrical connectors for the electrical apparatus entirely above ground; and
   a cover means hingedly attached to a top front edge of an upper portion and substantially enclosing that part of an upper portion front wall extending above ground.

7. An enclosure for an electrical distribution apparatus, comprising:
   a subway vault having an open top, an open bottom and a continuous substantially cylindrical side wall located below a ground level;
   a vertically oriented housing means for housing the electrical apparatus therein, said housing means having a lower portion extending a distance into said vault and an upper portion integrally formed with the lower portion, the upper portion extending upwardly therefrom, said upper portion being positioned substantially above ground, said housing means comprising a closed bottom, a closed top, a par of parallel side walls, a vertically oriented back wall and an inclined front wall, an upper part of said front wall defining an inclined control panel means for the electrical apparatus positioned within the housing means; and
   a cover means hingedly attached to a top front edge of said upper portion and substantially enclosing the upper portion front wall of the housing means.

8. The apparatus of claim 7, wherein the continuous side wall of the subway vault defines a housing means receiving space.

9. The apparatus of claim 8, wherein said subway vault further comprises a transverse upper wall, at least a part of which extends inwardly into the housing means receiving space in substantially perpendicular relationship to a vertical axis of the subway vault.

10. The apparatus of claim 9, further comprising a peripheral flange extending about an entire periphery of the housing means and the cover means and adapted to rest on the transverse upper wall of the subway vault, thereby supporting the housing means on the subway vault upper wall.

11. The apparatus of claim 7, wherein said continuous side wall is formed with a plurality of openings extending therethrough to allow access of the electrical apparatus to underground electrical conductors.

12. The apparatus of claim 7, wherein said control panel means is provided with a plurality of apertures to allow positioning of electrical connectors for the electrical apparatus entirely above ground.

* * * * *